United States Patent
Sivakumar et al.

(10) Patent No.: US 8,179,841 B2
(45) Date of Patent: May 15, 2012

(54) WIRELESS COMMUNICATION COLLISION CODING DEVICES, SYSTEMS, AND METHODS

(75) Inventors: Raghupathy Sivakumar, Alpharetta, GA (US); Sriram Lakshmanan, Atlanta, GA (US); Cheng-Lin Tsao, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 330 days.

(21) Appl. No.: 12/690,910

(22) Filed: Jan. 20, 2010

(65) Prior Publication Data

US 2010/0214983 A1 Aug. 26, 2010

Related U.S. Application Data

(60) Provisional application No. 61/145,808, filed on Jan. 20, 2009.

(51) Int. Cl.
*H04W 4/00* (2009.01)
(52) U.S. Cl. .......... 370/328; 370/445; 455/63.1
(58) Field of Classification Search .......... 370/328, 370/445; 455/63.1
See application file for complete search history.

(56) References Cited

U.S. PATENT DOCUMENTS

| | | | | |
|---|---|---|---|---|
| 7,277,451 B1 * | 10/2007 | Chen et al. | .......... | 370/445 |
| 2002/0173272 A1 * | 11/2002 | Liang et al. | .......... | 455/63 |
| 2010/0323706 A1 * | 12/2010 | Marsch et al. | .......... | 455/450 |

OTHER PUBLICATIONS

Gollakota, Shyamnath et al., "ZigZag Decoding: Combating Hidden Terminals in Wireless Networks", In Proc. of the ACM SIGCOMM, 2008, pp. 1-14.
Katti, Sachin et al., "Embracing Wireless Interference: Analog Network Coding", MIT, In Proc. of the ACM SIGCOMM, 2007, pp. 397-408.
Khina, Anatoly et al., "On Robust Dirty Paper Coding", In Proc. of IEEE ITW, 2008, pp. 204-208.
Laneman, J. Nicholas et al., "Distributed Space-Time -Coded Protocols for Exploiting Cooperative Diversity in Wireless Networks", IEEE Transactions on Information Theory, vol. 49, No. 10, Oct. 2003, pp. 2415-2425.
Pereira, Nuno et al., "WiDom: A Dominance Protocol for Wireless Medium Access", IEEE Transactions on Industrial Informatics, vol. 3, No. 2, May 2007, pp. 120-130.

* cited by examiner

*Primary Examiner* — Albert T Chou
(74) *Attorney, Agent, or Firm* — Ryan A. Schneider, Esq.; Troutman Sanders LLP

(57) ABSTRACT

Wireless communication collision coding devices, systems, and methods are provided. According to some embodiments, wireless communication systems can generally comprise a plurality of wireless access points and wireless clients. The wireless access points can be controlled by a network controller. The wireless access points can be configured to enable a plurality of wireless clients to wirelessly connect to the wireless access points. The wireless access points can be configured to encode data packets destined for the wireless clients with a collision coding scheme so that wireless data packets concurrently transmitted from at least two wireless access points colliding in air can be decoded at the wireless clients with the collision coding scheme so that data packets are not affected by collisions with another data packet. Other aspects, embodiments, and features, are also claimed and described.

24 Claims, 3 Drawing Sheets

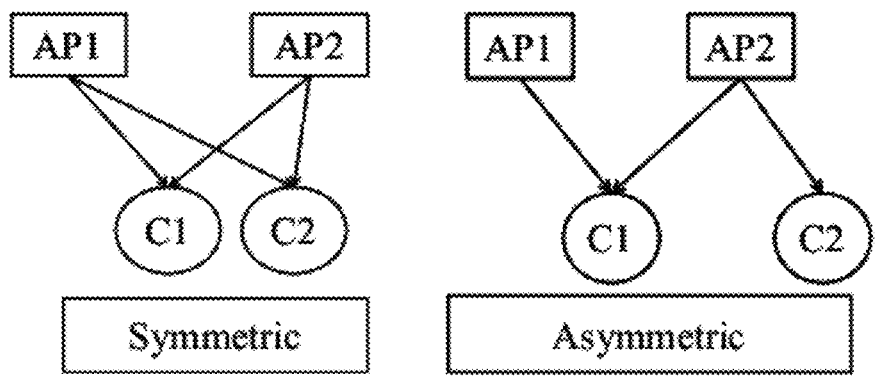
FIG. 1
| AP1 | AP2 | C1 | C2 | Successful ? |
|---|---|---|---|---|
| 0 | 0 | 0 | 0 | Yes |
| 0 | 1 | 1 | 1 | No |
| 1 | 0 | 1 | 0 | Yes |
| 1 | 1 | 1 | 1 | Yes |
FIG. 2
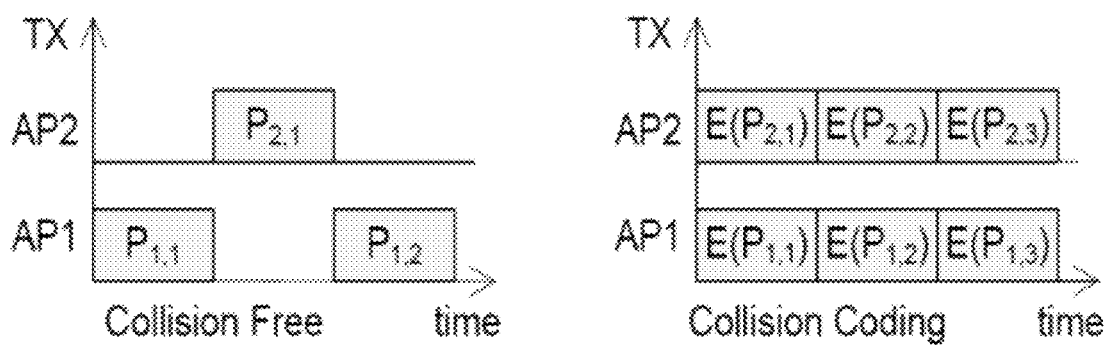
FIG. 3

FIG. 4
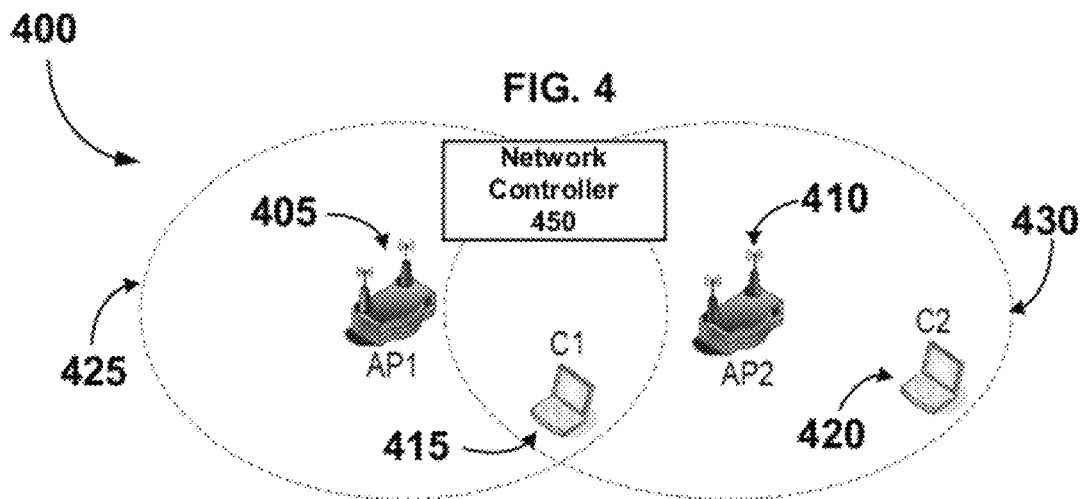
FIG. 5
FIG. 6
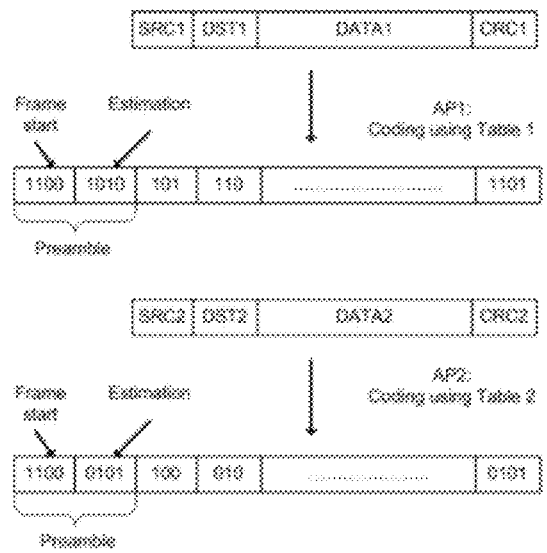

WIRELESS COMMUNICATION COLLISION CODING DEVICES, SYSTEMS, AND METHODS

CROSS-REFERENCE TO RELATED APPLICATION & PRIORITY CLAIM

This patent application claims the benefit of and priority to U.S. Non-Provisional Patent Application No. 61/145,808, filed 20 Jan. 2009, which is incorporated herein by reference in its entirety as if fully set forth below.

STATEMENT REGARDING FEDERALLY SPONSORED RESEARCH OR DEVELOPMENT

This invention was made with Government support under Agreement No. CNS-0721296, awarded by the National Science Foundation. The Government has certain rights in this invention.

TECHNICAL FIELD

Embodiments of the present invention relate generally to communication devices and protocols and more particularly to wireless communication protocols and wireless communication devices, systems, and methods.

BACKGROUND

A collision in a communication network refers to interference between multiple co-channel signal transmissions when arriving simultaneously at a receiver. Collisions typically render the intended signal non-decodable and contribute to reduced communication network performance. As a result, developers of communication networks have made efforts to address the negative effects spawned by signal collisions.

There exist several well-known techniques to avoid collisions of communication signals. These techniques include protocols to prevent collisions (e.g., the bit-map protocol), avoid collisions (e.g., CSMA/CA), lower waste due to collisions (e.g., CSMA/CD), or simply ignore collisions (e.g., ALOHA). These techniques have a general commonality—communication resources are wasted when collisions occur—even though they can be used to address signals that collide over or through a communication channel.

What is needed, therefore, are improved communication protocols and wireless communication devices, systems, and methods. Such improved mechanisms can be used to adequately address signal collisions yet do so in a manner that efficiently utilizes and does not waste communication resources. It is to the provisions of such communication protocols and wireless communication devices, systems, and methods that embodiments of the present invention are directed.

SUMMARY OF EXEMPLARY EMBODIMENTS

Embodiments of the present invention provide and enable novel communication techniques to enhance communication in networks. Generally network communication protocols attempt to avoid collisions between data packets since collisions degrade network performance. Embodiments of the present invention generally encode data packets to account for possible collision. Encoding can be accomplished via a collision coding function. Transmitters, receivers, and transceivers can all be configured to encode and decode data packets utilizing a collision coding function in accordance with some embodiments. While embodiments of the present invention are discussed with reference to certain types of communication networks (e.g., wireless networks or mesh networks), it should be understood that embodiments of the present invention may be utilized with any type of communication network.

In accordance with some embodiments, the present invention can comprise a wireless communication system that generally comprises a plurality of wireless transceivers in communication with each other. The wireless transceivers can each have an operating range wherein transceivers can transmit data packets. The wireless transceivers can be configured to simultaneously or concurrently transmit encoded data transmissions to multiple co-channel transceivers in overlapping operating ranges. Multiple transmissions can be done simultaneously or concurrently. And the wireless transceivers receiving multiple data transmissions from dissimilar transceivers can be configured to decode collided data transmissions resulting in successful data reception.

Wireless communication systems can also comprise other features. For example, systems can include a plurality of wireless access points (that can be wireless transceivers) and a network-controller. The wireless access points can be configured to enable a plurality of wireless clients to wirelessly connect to the wireless access points. Wireless communication systems can include wireless access points configured to encode data packets destined for one or more of the wireless clients with a collision coding scheme. The collision coding scheme can be generated or provided by the network controller so that wireless data packets concurrently transmitted from at least two wireless access points colliding in air can be decoded at the wireless clients with the collision coding scheme so that transmitted data packets are not affected by collisions with another data packet.

Embodiments of the present invention can also be implemented as a controller for use in a wireless communication network to control communications within the network. The controller (or network controller) can comprise a processor capable of implementing instructions stored as logic. The controller can comprise logic to assess topology of a network comprising a plurality of wireless access points and a plurality of wireless clients. The controller can be coupled to the wireless access points. The controller can also include logic, responsive to the assessed topology, to generate one or more coding tables enabling one or more of the wireless access points to encode data packets, in accordance with a collision coding function, for concurrent transmission to one or more of the wireless clients so that colliding data packets do not disturb integrity of data within the data packets. The controller may also include logic configured to synchronize transmission of wireless data packets from two or more of the wireless access points to one or more of the wireless clients.

Controller embodiments of the present invention can also include additional features. For example, the controller can be disposed within one of the plurality of wireless access points or wireless clients. Also, the coding tables generated or provided by the controller can contain information mapping data configured to enable one or more of the wireless access points to transform data to be transmitted in a modified data stream. The controller can be configured to transmit one or more of the coding tables to one or more of the wireless access points such that the one or more wireless access points can encode data packets according to one or more of the coding tables. Controller embodiments may also include logic to generate coding tables based on a modulation protocol used to transmit wireless signals within the network. In addition, controllers can include logic configured to map contents of multiple data packets to a codeword according to one or more coding tables and to transmit the codeword to multiple wireless clients.

Still yet other embodiments of the present invention include wireless communication systems generally comprising wireless access points configured to communicate with wireless clients. The wireless access points can be configured to allow one or more wireless clients to associate with one or more of the wireless access points. Wireless access points can be connected to a network such that the wireless clients can communicate with the network through an associated wireless access point. The wireless access points can be configured to store coding tables used to encode data packets for transmission to the wireless access points. The coding tables can be generated with a collision function such that the concurrent transmission of data packets to a single wireless client resulting in colliding data packets does not disturb the integrity of data within the data packets.

Wireless communication systems of the present invention can also include additional features. For example, wireless access points can be operatively coupled to a network controller to receive the coding tables from the network controller. Also, wireless access points can be configured to transmit concurrent data packets in a synchronized manner. Wireless access points can also transmit coding tables to at least one of the wireless clients enabling the wireless client to decode received data packets. Some wireless access points can monitor associated wireless clients to determine identity of local wireless clients and provides wireless client information to a network controller to dynamically update the coding tables. Also in some embodiments, wireless access points can utilize coding tables to decode data packets transmitted from one or more of the wireless clients.

Yet other embodiments include methods of managing data transmission within a network and/or concurrently transmitting simultaneous data packets over a communication medium. Such methods can include initially assess the topology of the network and based on the topology prepare coding tables to encode/decode data to avoid data integrity issues associated with collisions. Such methods also include synchronizing data transmissions by scheduling data transmission to optimize data throughput in a network.

Other aspects and features of embodiments of the present invention will become apparent to those of ordinary skill in the art, upon reviewing the following description of specific, exemplary embodiments of the present invention in concert with the figures. While features of the present invention may be discussed relative to certain embodiments and figures, all embodiments of the present invention can include one or more of the features discussed herein. While one or more embodiments may be discussed as having certain advantageous features, one or more of such features may also be used with the various embodiments of the invention discussed herein. In similar fashion, while exemplary embodiments may be discussed below as system or method embodiments it is to be understood that such exemplary embodiments can be implemented in various systems, and methods. Embodiments of the present invention can be implemented with hardware components, software logic, or a combination of both.

BRIEF DESCRIPTION OF FIGURES

FIG. 1 graphically illustrates symmetric and asymmetric collisions that sometimes occur in communication networks.

FIG. 2 is a table illustrating successful communication attempts over a communication medium.

FIG. 3 graphically depicts how embodiments of the present invention utilize collision coding to communicate in a communication network.

FIG. 4 illustrates a wireless communication network in which embodiments of the present invention can be utilized for effective wireless communication.

FIG. 5 illustrates exemplary coding tables used to encode wireless data communications to implement collision coding embodiments of the present invention.

FIG. 6 illustrates sample data packets and sample coded version of the data packets being coded with a collision coding code in accordance with some embodiments of the present invention.

DETAILED DESCRIPTION OF EXEMPLARY & ALTERNATIVE EMBODIMENTS

Figure 7:
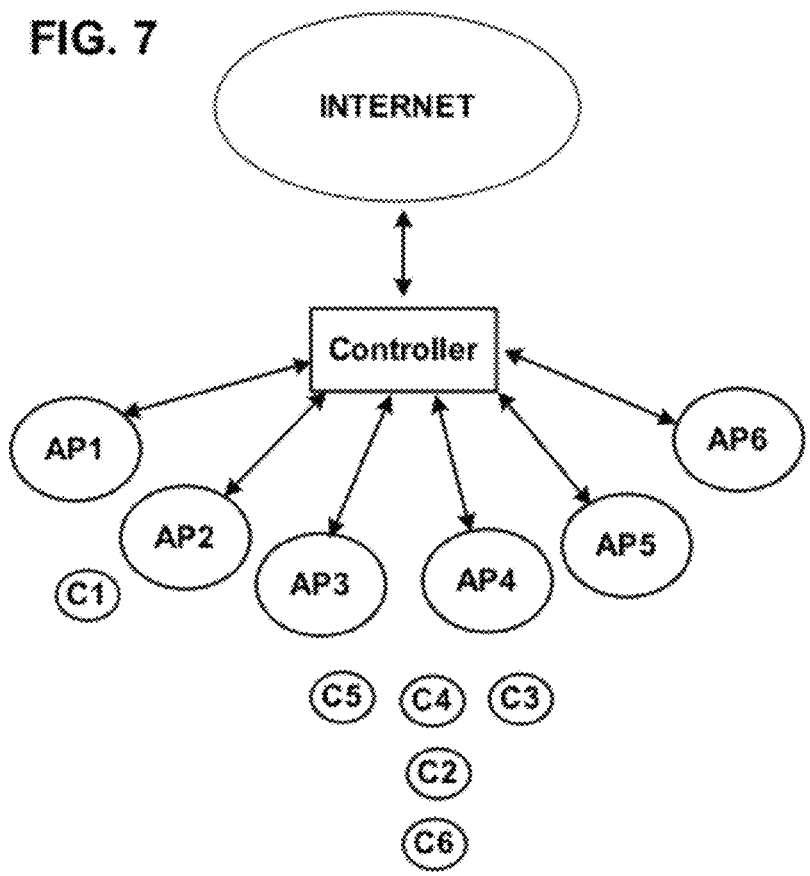
FIG. 7 illustrates a wireless communication network comprising communication components utilizing collision coding in accordance with some embodiments of the present invention.

To facilitate an understanding of the principles and features of the various embodiments of the invention, various illustrative embodiments are explained below. As will be explained below, embodiments of the present invention provide efficient and reliable communication network techniques. Advantageously, embodiments of the present invention implement cooperation based communication protocols to provide improved network throughput. Some embodiments are detailed as wireless network systems and component devices within wireless networks. As with all wireless networks, data can be transferred via an air medium and transmitted data may be referred to herein as data, data signals, data packets, bits, symbols, bytes, streams, and the like. In addition, these "data" terms may at times be used interchangeably herein.

Interference is a key principle which fundamentally affects the performance of wireless networks. Using air as a communication medium while providing connections and enabling mobility of terminals, also makes communications particularly susceptible to interference. The shared nature of the medium makes successful reception especially difficult in the presence of a concurrent sender. Hence wireless networks strive to prevent senders from interfering. Current networks either separate the transmissions from multiple senders in time using TDMA or probe for idleness and use the medium only when no other sender is using it, as in IEEE 802.11. The paranoia of interference is inherited from point to point system design and may not be the best choice for a network of multiple senders.

Embodiments of the present invention utilize dominant communication protocols to enable efficient and reliable communication. Instead of avoiding concurrent senders, dominance codes transmissions that occur concurrently and uses appropriate decoding to enable reception. Dominance leverages coordination between senders or receivers so that interference is not necessarily harmful. When two senders transmit simultaneously to two receivers where at least a receiver is located within the range of both transmitters, transmitted data packets can collide. The resulting, collided signal is the sum of the symbols transmitted by each of the senders (after incurring attenuation and phase shifts). Whenever data transmission (i.e., data bits or symbols) transmitted by one sender combines with a data transmission transmitted by another transmitter, the combination results in a collided signal that yields a different data content (i.e., has different data bits or symbols). The resulting collided signal can be decoded or mapped by the receiver to one of the possible symbols of its sender. As long as the combined symbols correspond uniquely to the data of the sender, successful information transfer can still happen despite collisions between data packets. Using this insight, if senders (or transmitters) can code their transmissions such that the sum (i.e., the collided data signal) still uniquely corresponds to the data intended for a specific receiver, receivers can appropriately modify their decoding to accommodate superposed symbols. In this case, information can be conveyed between each sender and receiver pair.

Embodiments of the present invention enable and utilize coding and decoding schemes where senders do not attempt to nullify interference but rather coordinate to enhance the successful delivery of each other's bits. In addition, while capacity bounds and arguments for multiuser coding and cooperation have been presented so far there is no practical algorithm that extends the insight to a network setting. Embodiments of the present invention can comprise a processor configured to decide how interfering transmissions can be coded and also include receiver architectures to accommodate them. Advantageously, coding can be performed at a bit (e.g., symbol) level so that it does not rely on channel conditions for enabling simultaneous transmissions. Because coding can take place at the bit level, modifications in RF transmission circuitry are not necessary. Another advantage of some embodiments is that concurrent transmission is enabled when the Signal to Interference Ratio (SIR) is close to 0 dB. This is unlike approaches where interfering transmissions must be well separated (>6 dB) in signal strength for decoding to be successful.

As mentioned above, collisions of data packets typically render an intended signal non-decodable. This directly contributes to lowering communication network performance. Generally, embodiments of the present invention leverage treatment of a specific class of collisions called asymmetric collisions. An asymmetric collision is one in which collisions at different receivers of the colliding signals are different. This is in contrast to a symmetric collision in which the collisions are the same at all receivers. By coding and decoding data transmitted in a network to account for asymmetric collisions, successful data transfer can occur despite collisions between concurrently transmitted data packets.

Interestingly, asymmetric collisions occur frequently in an important class of communication networks—wireless data networks. For example, consider FIG. 1 that graphically illustrates symmetric and asymmetric collisions that sometimes occur in communication networks. For purposes of this illustration, access points AP1 and AP2 operate on the same communication channel (e.g., air in a wireless network) and C1 and C2 are both within range of AP1 and AP2. During transmission, both AP1 and AP2 both transmit signals to C1 and C2. Doing so, results in collisions at both C1 and C2. In the asymmetric scenario, where C2 is moved out of range of AP1, AP1 and AP2 both transmit simultaneously to client C1 and AP2 transmits to C2. The dual transmission to C1 causes a signal collision at C1. C2, however, receives a clear signal from AP2 thereby creating an asymmetric collision between C1 and C2. While the asymmetric collision in this specific scenario involved one of the receptions being clear, this is not a requirement for asymmetric collisions. While embodiments of the present invention, in a general sense, are aimed at communication techniques to aid in resolving collisions occurring in the asymmetric scenario, the techniques discussed herein can also be applied to create effective and high performance communication in other network settings.

FIG. 2 is a table illustrating successful communication attempts over a communication medium for the asymmetric scenario illustrated in FIG. 1. With reference to FIG. 1, let the data sent from AP1 be d1 and the data sent from AP2 be d2. In this topology, client C1 can receive information from AP1 and AP2 whereas client C2 is within communication range of AP2 only. Conventional collision free scheduling, would require the transmissions for C1 and C2 be separated in time because AP2's data transmission would cause a collision at C1 thereby rendering it unable to decode the packet sent by AP1. Embodiments of the present invention enable concurrent transmission of the data packets so that no time separation is needed. FIG. 3 graphically depicts how embodiments of the present invention utilize collision coding to communicate in a communication network and compares "Collision Coding" communication protocols relative to "Collision Free" protocols.

To understand how to code the transmissions such that information is conveyed on a collision, one must understand collisions. With reference to the asymmetric scenario of FIG. 1, consider that Amplitude Shift Keying modulation is used to transmit data between the illustrated access points and clients. Because the channel combines transmitted signals for reception at C1, consider the channel to be represented by the logical OR function where C1 receives the OR of d1 and d2 (or the bits transmitted by AP1 and AP2). When the interfered bits are analyzed to determine if communication has been successful and depending on whether AP1 and AP2 transmit a 0 or a 1, the table in FIG. 2 shows the result. The table shows at the bit-level the decoded information received at C1 based on the corresponding values for d1 and d2. As shown, for three of the four combinations of values, the correct bit information for C1 is actually preserved through the ASK modulation process despite the collision. For one of four possible combinations, C1 receives an erroneous bit (the "NO" successful combination). The bit error rate for this particular set-up is 25% when allowing collisions to occur.

FIG. 4 illustrates a wireless communication network 400 in which embodiments of the present invention can be utilized for effective wireless communication. As shown in FIG. 4, the network 400 generally comprises two wireless access points 405, 410 (sometimes referred to as AP1 and AP2, respectively) and two wireless clients 415, 420 (sometimes referred to as C1 and C2, respectively). The wireless access points 405, 410 can be wireless routers or other devices enabling wireless access to a network. The wireless clients 415, 420 can be wireless network cards, mobile network devices, or many other devices capable of interacting with a wireless access point. As illustrated by the dashed circles, the wireless access points 405, 410 have operating ranges 425, 430.

Within these ranges 425, 430, the wireless access points 405, 410 can serve clients and monitor which clients are associated with them. For example network 400, can include a first wireless client 415 located in an area in which the operating ranges 425, 430 overlap and a second wireless client 420 is located in the operating range 430 of wireless access point 420. Because the first wireless client 415 is located in an overlapping region of the ranges 425, 430, it can be associated with both wireless access points 405, 410. In this fashion, both wireless access points 405, 410 can concurrently transmit data transmissions and the first wireless client 415 can receive both data transmissions from the wireless access points 405, 410. This arrangement can result in an asymmetric collision scenario described above and illustrated in FIG. 1.

To address and alleviate data integrity issues associated with collisions of data packets in network 400, the network 400 can include mechanisms to account for collided data signals. In some embodiments, the network 400 may include a network controller 450 that manages all of some of the communication within the network. The network controller 450 can be implemented as hardware, software, or a combination thereof. The network controller 450 may be a stand-alone component as shown in FIG. 4, the network controller 450 may reside in or on components of the network 400 (such as those shown in FIG. 4), or the network controller 450's functions can be spread among components of the network 400 (such as the components shown in FIG. 4).

Networks according to embodiments of the present invention can be arranged in many fashions. For example, and in currently preferred embodiments, the network controller 450 can be positioned at a hierarchical level above wireless access points. It may, for example, reside at a router or access point controller that is hard wired or otherwise coupled to the wireless access points 405, 410. In other arrangements, the network controller 450 may be a leading or master wireless access point (like wireless access points 405, 410) or a wireless client (like wireless clients 415, 420). Preferably, the network controller 450, wherever situated, has knowledge of the data signals being transmitted to and from the various clients in the network 400. In addition, the network controller 450 can include a processor, a memory, be configured to assess the state of the network's 400 topology, and be configured to control how data flows within the network. And in some embodiments, the network controller's 450 processor can be configured to implement logical instructions (e.g., software or firmware) stored in memory to control concurrent data transmission protocols in the network.

Indeed, by having knowledge of the data flow of the network 400, the network controller 450 can control data flow in the network 400. As an example, the network controller 450 can monitor the state or topology of the network 400. Based on the topology of the network 400, the network controller 450 can devise appropriate coding schemes to alleviate data integrity problems associated with collisions of data packets. For example, the network controller 450 can create a coding table like those shown in FIG. 5. FIG. 5 illustrates exemplary coding tables used to encode wireless data communications to implement collision coding embodiments of the present invention. For convenience of discussion, the table of FIG. 5 assumes that a network has a topology equivalent to that of the network 400 and that the network employs an ASK modulation scheme to transmit wireless data. It should be understood that the coding tables shown in FIG. 5 are exemplary and that coding tables generated by a network controller will depend upon network topology and modulation schemes used for data transmission.

To generate one or more coding tables, a network controller (such as network controller 450) can implement a collision coding function that accounts for various communication scenarios in a network. Generically (and following the abbreviation notations mentioned above), collision coding refers to applying an appropriate coding function e such that $f_c(e(d1); e(d2))$ is equal to $e(d1)$. The property of $e(d1)$ not being affected by a collision with $e(d2)$ is known as $e(d1)$ being dominant over $e(d2)$.

To continue explanation of the collision coding function, let d1 and d2 be the data for clients c1 and c2 and e(x) represent the codeword of data x. For the data d1 and d2, we want the transmitted codewords to satisfy, $e(d1)+e(d2)=e(d1)$ (and $e(d2)+e(d1)=e(d1)$) (i.e., the codewords satisfy the OR property). Thus, a sender a1 which sends data d1 is said to be dominant over sender a2 for a client present in the overlapping region of both senders if the above condition is satisfied. In general, the operator '+' refers to the collision function. Coding the transmissions to achieve this condition enables a normally interfered receiver (e.g., c1) to receive from its sender (i.e., AP a1) without being affected by the other sender's (a2's) transmission (e.g., FIG. 2). More generally, given a topology with N access points and N clients (N being the degree of the topology), where a link exists between AP ai and cj if client cj is within the communication range of ai. Then the condition for being able to send data to all N clients is as follows:

$$\sum_{i \in [1,N]} e(d_i) = e(d_j); \forall\, j \in [1, N]$$

where:
$\Sigma$ is the collision function (e.g., binary addition operator);
dj is the data from associated AP for client cj;
$f(di)=0$ if ai's transmission does not interfere at cj and '1' otherwise.

While the coding tables shown in FIG. 5 are explicitly created for the bitwise "OR" operator exercised by the channel when using ASK, similar tables can be constructed for other modulations in other embodiments. Indeed by using the above coding function, the network controller 450 can devise appropriate coding tables to account for collisions in data signals.

FIG. 6 illustrates sample data packets and sample coded version of the data packets being coded with a collision coding code in accordance with some embodiments of the present invention. Again, continuing the abbreviation convention above, let d1 be DATA1 and d2 be DATA2. As shown, both of the data packets containing DATA1 and DATA2 include several components: source, destination, data (or payload), and correction bits (CRC). By using coding tables (like those shown in FIG. 5) a network controller (like network controller 450), wireless access point, or other network component can encode the data packets for transmission. For example, wireless access point 405 can use the code tables in FIG. 5 and the wireless access point 410 can use the C2/AP2 coding table in FIG. 5. Because the code table is agreed upon and distributed to various network components, including clients 415, 420, receivers of encoded data packets can decoded the data packets to obtain transmitted data.

The encoding/decoding process may take various arrangements according to some embodiments of the invention. For example, the wireless access points 405, 415 can create coded packets from the data packets. Specifically, the wireless access point 405 can use data packets destined to wireless clients 415, 420, including its payload, headers, and error correction CRC bits. In other embodiments, a network controller or other wireless transceiver can create coded data packets and/or decode coded data packets.

In one current embodiment, for every pair of two bits (two bits from each of and C2's packets), the wireless access points 405, 410 can be configured to produce a three-bit codeword using the coding tables of FIG. 5. For example, if wireless access point 405 is transmitting data sequence 00 01 to C1 and the wireless access point 410 is transmitting data sequence 11 10 to C1 and C2 the following can occur. The wireless access points can encode the data so that the wireless access point 405 sends data sequence 011 010 to C1, and wireless access point 410 sends data sequence 100 010 to C1 and C2. Given that a collision would occur at C1 by virtue of the colliding encoded data packets (i.e., 011 010 and 100 010) and assuming the logical OR operation happens during transmission (i.e., ASK modulation), the following data sequence would result at the wireless access point 405: 111 010. After decoding this sequence at C1 with the coding tables in FIG. 5, the following data package results at C1: 00 01. And in similar fashion, AP2 uses C2's payload to decode its codeword according to its table: 11 10.

As mentioned above in discussing one embodiment, for any pair of two bits considered, the wireless access points 405, 410 can generate codewords T1 and T2 such that T1+T2=T1, where + is the binary 'OR' operator. Coding can be performed until maximum payload size is reached or as desired. The wireless access points 405, 410 can also encode preamble, header, and CRC data. A preamble can, for example, consist of a known sequence beginning with '1' for detecting the start of a frame and few additional bits that aid channel estimation, as shown in FIG. 6. Preambles can be inserted before data packets to help C1 and C2 identify that a packet is due for them. Doing this can also be used to prevent them from triggering the reception process and also to identify the start of a packet.

FIG. 7 illustrates a wireless communication network 700 comprising communication components utilizing collision coding in accordance with some embodiments of the present invention. As shown, the network 700 includes a controller, a plurality of access points (AP1-AP6), and a plurality of clients (C1-C6). The network 700 can implement embodiments of the invention as shown or can be expanded with additional access points and clients. Generally, in operation, clients can link or associate with one or more access points to gain access to a network, such as the Internet. The access points can be mesh hot spot devices, wireless routers, network switches, or many other devices enabling clients to access a gateway network. In similar fashion, the clients can be many types of devices configured to transceiver wireless data packets. The controller shown can be indirectly or directly coupled to the access points and the clients (either wired, wireless, or combinations thereof). In this arrangement, the controller can manage communication in the network 700 between access points and clients.

The controller can also include additional functionalities to manage dynamic movement of the network 700. Collision coding can be applied as long as the senders or receivers of information can be coordinated. A popular application scenario which allows sender coordination is the enterprise network 700 in FIG. 7, where a controller controls the actions of APs and clients. The controller has access to all the upstream and downstream packets of the network and can be connected to each of the access points using a wired connection. Thus, it forms a natural seat for controlling which access points should coordinate appropriate collision coding concurrent transmissions. Further, upstream and downstream communication can alternate in epochs. According to some embodiments, the controller can communicate with access points using a high bandwidth wired connection, and the APs and clients communicate over a wireless channel. The controller can also acts as a time server and distributes time to the APs that are connected to it. Thus the clocks of the APs are synchronized to the controller to enable synchronous data transmission and data reception.

The controller can also be used to control scheduling of packets for transmission. For example, the controller can have a queue of packets destined to different clients, where each client associates with an AP. The controller selects the first packet for any of the associated clients of each AP to maintain FIFO delivery. The selected AP-client pairs form a connectivity graph which is input to code scheduling algorithm. The controller encodes the packet using coding tables and to ensure optimal packet scheduling. Packet selection can form a topology that is equivalent to the topology in FIG. 4. For example, optimal coding can encode data packets based on templates.

Embodiments of the present invention can also be used to implement collision coding for a given network of APs and clients. This can be done using network topology templates. From the viewpoint of collision coding, there are 'templates' for which any network topology can be represented. For example, a network controller can identify network templates and construct codes constructed for the network templates. Templates can be used to identify the optimal code for a given topology so that aggregate throughput of a given network is maximized (subject to maxim fairness). Embodiments of the present invention include various method embodiments that can aid in implementing collision coding for various-sized networks.

The controller (sometimes referred to as a genie) in network 700 can also be configured to manage collision code scheduling in both system and method embodiments. These embodiments can implement a scheduling algorithm. The algorithm takes as input a connectivity graph between APs and clients under consideration for a time slot and produces as output a code schedule for different APs that optimizes capacity. If a collision code is applicable to the whole input topology (i.e there is a collision code schedule of degree N for this topology consisting of N APs and N clients), the code already optimizes capacity for that topology and it is used. Otherwise, multiple collision codes of lower degrees are used in combination at different APs and different times to achieve optimal throughput under max-min fairness. Determining which of the lower degree codes should be applied and for what fraction of the time, so that max-min throughput is achieved is the goal of the algorithm. Since the number of unique topologies is not very high, the optimal code for each unique topology is predetermined and stored for lookup.

A collision code scheduling algorithm can include a few steps. First, template instances can be identified. Second independent sets can be determined. And finally, an optimal allocation being transmitters and receivers can be determined. These steps are discussed below.

The first step is to apply all templates to an input topology and enumerate all instances. An input topology consists of k AP-client pairs and a connectivity graph G from APs to clients. Table I shows an example of input connectivity graph with three AP-client pairs. Each of the templates in Table I is used to generate multiple instances by replacing symbols with any permutation of AP/client index numbers. An instance is considered valid only if it is an 'induced subgraph' in the input topology. The generated instances are illustrated in Table II.

TABLE I

| Id | 1 | 2 | 3 | 4 | 5 |
|---|---|---|---|---|---|
| Template | (template 1) | (template 2) | (template 3) | (template 4) | (template 5) |
| Number of Links | 1 | 2 | 3 | 3 | 3 |
| Per-link Capacity | 1 | 0.67 | 0.67 | 0.67 | 0.5 |
| Total Capacity | 1 | 1.33 | 2 | 2 | 1.5 |

TABLE II

There is one template of degree 1, and one template of degree two. For degree three, there are three unique templates corresponding to the interference among APs. Instances can be determined by the following equation:

$$I = \{I = (\{A \cup C'\}, E) = G_{T_i}(A'), \forall T_i \epsilon T, \\ A' \subseteq A | e \epsilon E', \forall e = (a_i, c_j) \epsilon E, a_i \epsilon A', c_j \epsilon C'\}$$

where I is the set of instances, T is the set of templates, and $G_{T_i}$( ) is the function that maps template $T_i$ to a set of AP-client pairs, represented as the AP set A'.

The next step is to generate a conflict graph of instances and enumerate all independent sets. If two instances cannot operate simultaneously, i.e. any client in one instance is interfered by any AP in another, then they are connected with an edge in the conflict graph. Table II shows the conflict graph of instances in Table III. Then the algorithm enumerates all independent sets in the conflict graph. Since the conflict graph usually has a small size and high node degree, a greedy algorithm (shown below) is used to identify all independent sets with minimal complexity.

$$G'' = (V'' = I, E'')$$

$$E'' = \{(u,v), \forall u \epsilon V'', v \epsilon V'' | u \text{ and } v \text{ are not independent in } G\}$$

$$S = \{s \subseteq V'' | s \text{ is an independent set in } G''\}$$

where G'' is the conflict graph of instances I, S is the set of all independent sets in G''.

TABLE III

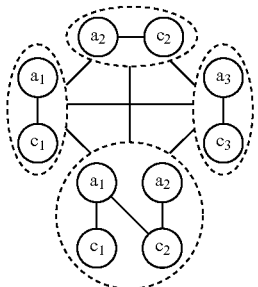

The last step is to form a linear problem to compute an optimal allocation of all independent sets to achieve max-min capacity, i.e. each client gets at least one unit of capacity. The linear problem can be formed using the following equation.

$$\min \Lambda = \sum_{S_i \in S} \lambda_i$$

$$\text{s.t.} \sum_{S_i \in S} \lambda_i \sum_{I \in S^i, cj \in I} F_I \geq 1, \forall cj \in C.$$

where $\lambda_i$ is the time allocated to independent set $S_i$, and $F_{Ij}$, is capacity of each client in instance I, which value is given by the corresponding template. The optimal allocation in the example is to code using template $T_2$ from AP1 and AP2 for 1.5 slots and schedule AP3 separately for 1 slot, yielding one unit of capacity for each of the clients.

Collision coding, as described thus far, requires symbols received at a receiver from multiple transmitters to be synchronized. To obtain synchronized symbols at the receiver, not only must the transmissions be synchronized, but the channel induced delay spread must be small compared to the symbol duration. The delay spread in indoor networks is limited to 10s to 100s of nanoseconds thus posing no issue to synchronization. Hence, the granularity of synchronization at the transmitters assumes importance and must be as low as possible. In practice, however, while it is possible to synchronize two transmitters to a tight level of synchronization using different approaches such as the use of hardware interconnects or control packet triggering, any communication solution still needs to be robust to loss of synchronization. Below, we focus on how collision coding is made tolerant to loss in synchronization. Although time offsets between transmissions need not be integral multiple of symbol duration, symbol level delays are generally more critical than intra-symbol delays.

To achieve tolerance to loss of synchronization, we leverage the property of dominance achieved by collision coding, soft signal information (SSI) available before bit decoding, and the degree of freedom in code design. These three levers can be used to tackle a single bit synchronization offset between the senders. The below-discussed procedure can be generalized to any number of bits by appropriately adjusting the coding algorithm.

To understand the synchronization offset, consider two codeword streams transmitted by two senders AP1 and AP2 to receivers c1 and c2 as in FIG. 4. A part of the received symbols at c1 is presented in FIG. 9. When AP2's transmission is shifted one bit to the right as shown in TABLE IV, there is a single bit that is interfered at c1. If the bit is decoded as a '0', then the intended bit for c1 is '0'. However, if the decoded bit is a '1', then there are multiple possibilities for the transmissions. By looking at the soft signal information before decoding, it is possible to identify if the SSI was a 1 or a 2. If the SSI is 2, then the intended bit for c1 is uniquely determined as '1 since only a '1' and a '1' can combine to yield '2'. If the SSI is '1', then the bits that combined in the air are either a (0,1) or (1,0). If the bits that combined were a 0 and 1, then the bits sent by x and y have a unique solution '10' and '10' as shown in Table IV, since the transmitted symbols must satisfy the dominance property. However, in this case, c1 receives a '1' when AP1 sent a '0'. Hence, if this combination of '10' strings occurring in the codewords of x and y is avoided, then an SSI value of 1 can always be interpreted as the (1,0) case. Client c1 can receive correct bits even with a timing offset between the transmissions.

TABLE IV $$\begin{array}{c} c_1 \\ c_2 \end{array} + \frac{?\,1\quad 1\,0}{0\,?} \quad + \frac{1\,0}{1\,0}$$

The synchronization strategy discussed above can be seamlessly integrated into the template construction algorithm presented in x 3. The constraint for tolerating a single right bit shift can be given as follows: No two codewords of AP1 and AP2 have aligned '10' pattern and the codewords do not both end in a '1' (inter-codeword '10' pattern is avoided). If this constraint is included while constructing codewords, then c1 can continue to receive in the presence of a single bit right shift. However, there is a cost that must be incurred in providing tolerance to synchronization loss. Specifically, the generated code in this case achieves a rate of 1.14 as opposed to 1.33 for the perfectly synchronized case. The procedure previously mentioned can be extended to design codes for a single bit shift to the left by avoiding the occurrence of '01' at the same position and both '0' at the end of the codewords of x and y. Similarly, this procedure can be extended for accommodating other values of bit-shifts.

Collision Coding can also be applied to the uplink of the scenario (FIG. 4) where C1 and C2 transmit to AP1 and AP2 respectively but cause collisions at AP1. In this case, the two main considerations are synchronization of C1's and C2's transmissions and coding. The absence of a wired backbone between C1 and C2, make their synchronization different from synchronization of AP1 and AP2. In this case, the solution uses the reception of a control or trigger packet on the wireless link from AP2 to trigger C1 and C2. Related work has already demonstrated the feasibility of achieving synchronization to within 10 μs using this approach on 802.11 cards. Thus AP2 transmits a control packet informing C1 and C2 to transmit after a preset time from the reception of the packet, thereby synchronizing their transmissions.

The second aspect of uplink operation is coding. Observe that C1 and C2 cannot jointly encode their information without wasting a time slot for wireless information exchange. Hence the strategy is for C1 and C2 to code independently and use the AP1 and AP2 together to decode all the transmitted bits. Observe from FIG. 4 that C1's transmission is received successfully at AP1 whereas at AP2, packets of C1 and C2 collide. AP2 can use the correct bits of C1 from AP1 to decode the collided bits. However, without coding some of the bits are not be resolvable. As an example consider that the nth collided bit at AP2 is a '1' and the nth bit at AP1 is also a '1' i.e C1 transmitted a '1'. In this case, it is impossible to say using AP2's received bit whether C2 transmitted a '1' or '0', because both 1+0=1 and 1+1=1. Hence, the transmissions of C1 and C2 must be independently coded.

For the coordinated receive case, since one of the transmissions is received without any interference, the codewords must be designed such that the interfered codeword maps uniquely to each data bit transmitted as shown in Tables V-VI. It can be observed that every possible data bit combination in Table V can be uniquely decoded using Table VI.

TABLE VI

| | C1 | | | |
|---|---|---|---|---|
| RX2 | 00 | 01 | 10 | 11 |
| 001 | 10 | 10 | — | — |
| 010 | 00 | — | 00 | — |
| 011 | — | 00 | 10 | — |
| 100 | 01 | — | — | 01 |
| 101 | — | 01 | — | 10 |
| 110 | — | — | 01 | 00 |
| 111 | 11 | 11 | 11 | 11 |

TABLE V

| data | C1-code | C2-code |
|---|---|---|
| 00 | 000 | 010 |
| 01 | 001 | 100 |
| 10 | 010 | 001 |
| 11 | 100 | 111 |

Table VI indicates that such a pair of RX2 and C1 is not possible under correct operation. Those states can be used for error detection or correction. Using this scheme C1 and C2 can convey two bits each in three bit-slots leading to a total throughput of 4 3=1:33. Thus, collision coding can be used upstream to yield benefits over collision free schedules.

Figure 8:
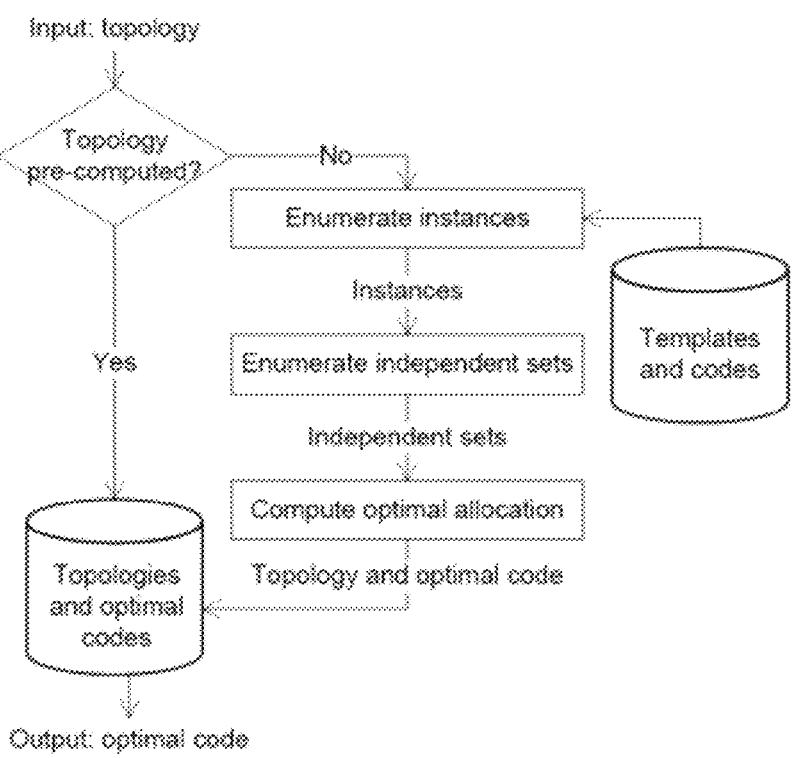
FIG. 8 illustrates a collision coding method capable of managing communication in a communication network in accordance with some embodiments of the present invention.

FIG. 8 illustrates a collision coding method 800 capable of managing communication in a communication network in accordance with some embodiments of the present invention. The method 800 can generally include constructing templates to model network topology and scheduling data transmissions based on the templates. An aim of the method can be to identify codeword assignments for each data word combination for APs such that each client ci successfully decodes its data as di=Di(Ei(d)). To do this, when transmissions of multiple senders collides at a receiver, successful decoding can be achieved by assigning more 1's to the associated sender and 0's to the interfering sender(s). The method can produce encoding functions Ei(m) at each AP ai. The process can be iterative and assign codewords for each data word d (i.e all possible data bit combinations of d1, d2, ..., dk) for the given topology. To begin, the process can initialize a set of codewords for each dataword e(d; i) at each sender ai, with all codewords of length W as possible codewords to use (i.e., Ie(d; i)I=2W). Then, AP and dataword selection, Codeword selection, and update of codeword set steps can be performed sequentially until codewords have been assigned at each AP for all the dataword combinations or the codewords at any of the APs is exhausted.

After construction of templates for network topology, scheduling of data transmission event can be analyzed and performed. These functions can be implemented by a network controller (such as the controller in FIG. 7). The controller can schedules packets in transmission slots to optimize network throughput is optimized. To do this, the controller can first obtain packets from a data stream such that there is one packet for each AP corresponding to exactly one of its associated clients. After identifying the clients that are to be served, the controller can obtains a connectivity graph of the APs and clients under consideration.

The method 800 can include taking as an input a connectivity graph between APs and the clients under consideration. This can be done for a particular slot to produce as output a code schedule for different APs that optimize capacity. If a collision code is applicable to input topology (i.e., there is a collision code schedule of degree N for this topology consisting of N APs and N clients), the code already optimizes capacity for that topology and it is used. Otherwise, multiple collision codes of lower degrees are used in combination at different APs and different times to achieve optimal throughput under max-min fairness. Determining which of the lower degree codes should be applied and for what fraction of the time, so that max-min throughput is achieved is the goal of the algorithm. Since the number of unique topologies is not high, optimal codes for each unique topology is precomputed and stored for quick lookup.

The embodiments of the present invention are not limited to the particular formulations, process steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof. Indeed, the above descriptions are exemplary and yet other features and embodiments exist.

Therefore, while embodiments of the invention are described with reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

We claim:

1. A wireless communication system comprising:
a plurality of wireless transceivers in communication with each other, the wireless transceivers each having an operating range wherein transceivers can transmit data packets; and
a plurality of wireless access points as the wireless transceivers and a network controller, the wireless access points configured to enable a plurality of wireless clients to wirelessly connect to the wireless access points;
wherein the wireless transceivers are configured to simultaneously transmit encoded data transmissions to multiple co-channel transceivers in overlapping operating ranges and wherein transceivers receiving multiple data transmissions from dissimilar transceivers are configured to decode collided data transmissions resulting in successful data reception; and
wherein the wireless access points are configured to encode data packets destined for one or more of the wireless clients with a collision coding scheme provided by the network controller so that wireless data packets concurrently transmitted from at least two wireless access points colliding in air can be decoded at the wireless clients with the collision coding scheme so that transmitted data packets are not affected by collisions with another data packet.

2. The wireless communication system of claim 1, wherein the network controller is configured to schedule transmission of data packets from the wireless access points to the wireless clients.

3. The wireless communication system of claim 1, wherein the network controller is coupled to the plurality of wireless access points.

4. The wireless communication system of claim 1, wherein the network controller is disposed within at least one of the wireless access points.

5. A wireless communication system of comprising:
a plurality of wireless transceivers in communication with each other, the wireless transceivers each having an operating range wherein transceivers can transmit data packets; and
a plurality of wireless access points as the wireless transceivers and a network controller, the wireless access points configured to enable a plurality of wireless clients to wirelessly connect to the wireless access points;
wherein the wireless transceivers are configured to simultaneously transmit encoded data transmissions to multiple co-channel transceivers in overlapping operating ranges and wherein transceivers receiving multiple data transmissions from dissimilar transceivers are configured to decode collided data transmissions resulting in successful data reception; and
wherein the network controller is configured to determine the number and connectivity of wireless clients relative to the plurality of wireless access points and determine one or more coding tables to implement the collision coding scheme.

6. The wireless communication system of claim 1, wherein the network controller is configured to synchronize transmission of data packets from one or more of the wireless transceivers for transmission to one or more of the wireless transceivers.

7. A wireless communication system comprising:
a plurality of wireless transceivers in communication with each other, the wireless transceivers each having an operating range wherein transceivers can transmit data packets; and
a plurality of wireless access points as the wireless transceivers and a network controller, the wireless access points configured to enable a plurality of wireless clients to wirelessly connect to the wireless access points;
wherein the wireless transceivers are configured to simultaneously transmit encoded data transmissions to multiple co-channel transceivers in overlapping operating ranges and wherein transceivers receiving multiple data transmissions from dissimilar transceivers are configured to decode collided data transmissions resulting in successful data reception; and
wherein the network controller is configured to implement the collision coding scheme as a function of modulation protocols used to transmit the wireless data packets.

8. A wireless communication system of comprising:
a plurality of wireless transceivers in communication with each other, the wireless transceivers each having an operating range wherein transceivers can transmit data packets; and
a plurality of wireless access points as the wireless transceivers and a network controller, the wireless access points configured to enable a plurality of wireless clients to wirelessly connect to the wireless access points;
wherein the wireless transceivers are configured to simultaneously transmit encoded data transmissions to multiple co-channel transceivers in overlapping operating ranges and wherein transceivers receiving multiple data transmissions from dissimilar transceivers are configured to decode collided data transmissions resulting in successful data reception; and wherein the network controller is configured to transmit data coding tables to the wireless access points enabling the wireless access points to code data transmissions to the clients.

9. A wireless communication system comprising:
a plurality of wireless transceivers in communication with each other, the wireless transceivers each having an operating range wherein transceivers can transmit data packets; and
a plurality of wireless access points as the wireless transceivers and a network controller, the wireless access points configured to enable a plurality of wireless clients to wirelessly connect to the wireless access points;
wherein the wireless transceivers are configured to simultaneously transmit encoded data transmissions to multiple co-channel transceivers in overlapping operating ranges and wherein transceivers receiving multiple data transmissions from dissimilar transceivers are configured to decode collided data transmissions resulting in successful data reception; and
wherein the network controller is configured to directly or indirectly transmit data coding tables to the clients enabling the clients to decode data transmissions from the wireless access points.

10. A wireless communication system comprising:
a plurality of wireless transceivers in communication with each other, the wireless transceivers each having an operating range wherein transceivers can transmit data packets; and
a plurality of wireless access points as the wireless transceivers and a network controller, the wireless access points configured to enable a plurality of wireless clients to wirelessly connect to the wireless access points;
wherein the wireless transceivers are configured to simultaneously transmit encoded data transmissions to multiple co-channel transceivers in overlapping operating ranges and wherein transceivers receiving multiple data transmissions from dissimilar transceivers are configured to decode collided data transmissions resulting in successful data reception; and
wherein the network controller is configured to determine the collision coding scheme as a function of network topology.

11. A wireless communication system comprising:
a plurality of wireless transceivers in communication with each other, the wireless transceivers each having an operating range wherein transceivers can transmit data packets; and
a plurality of wireless access points as the wireless transceivers and a network controller, the wireless access points configured to enable a plurality of wireless clients to wirelessly connect to the wireless access points;
wherein the wireless transceivers are configured to simultaneously transmit encoded data transmissions to multiple co-channel transceivers in overlapping operating ranges and wherein transceivers receiving multiple data transmissions from dissimilar transceivers are configured to decode collided data transmissions resulting in successful data reception; and
wherein the network controller is configured to determine the collision coding scheme to establish symbol dominance between an intended signal and an interfering signal received at one of the wireless clients.

12. A wireless communication system comprising:
a plurality of wireless transceivers in communication with each other, the wireless transceivers each having an operating range wherein transceivers can transmit data packets; and
a plurality of wireless access points as the wireless transceivers and a network controller, the wireless access points configured to enable a plurality of wireless clients to wirelessly connect to the wireless access points;
wherein the wireless transceivers are configured to simultaneously transmit encoded data transmissions to multiple co-channel transceivers in overlapping operating ranges and wherein transceivers receiving multiple data transmissions from dissimilar transceivers are configured to decode collided data transmissions resulting in successful data reception; and
wherein the network controller is configured to generate one or more coding tables based on the collision coding scheme such data transmitted between wireless access points and wireless clients can be encoded and decoded based on the one or more coding tables.

13. A controller for use in a wireless communication network to control communications within the network, the controller comprising a processor capable of implementing instructions stored as logic, the controller comprising:
logic to assess topology of a network comprising a plurality of wireless access points and a plurality of wireless clients, wherein the controller is coupled to the wireless access points;
logic, responsive to the assessed topology, to generate one or more coding tables enabling one or more of the wireless access points to encode data packets, in accordance with a collision coding function, for concurrent transmission to one or more of the wireless clients so that colliding data packets do not disturb integrity of data within the data packets; and
logic configured to synchronize transmission of wireless data packets from two or more of the wireless access points to one or more of the wireless clients.

14. The controller of claim 13, wherein the controller is disposed within one of the plurality of wireless access points or wireless clients.

15. The controller of claim 13, wherein the coding tables contain information mapping data configured to enable one or more of the wireless access points to transform data to be transmitted in a modified data stream.

16. The controller of claim 13, wherein the controller is configured to transmit one or more of the coding tables to one or more of the wireless access points such that the one or more wireless access points can encode data packets according to one or more of the coding tables.

17. The controller of claim 13, further comprising logic to generate the one or more coding tables based on a modulation protocol used to transmit wireless signals within the network.

18. The controller of claim 13, further comprising logic configured to map contents of multiple data packets to a codeword according to one or more coding tables and to transmit the codeword to multiple wireless clients.

19. A wireless communication system comprising:
a plurality of wireless access points configured to allow one or more wireless clients to associate with one or more of the wireless access points;
the plurality of wireless access points being connected to a network such that the wireless clients can communicate with the network through an associated wireless access point;

the plurality of wireless access points being configured to store coding tables used to encode data packets for transmission to the wireless access points, the coding tables being generated with a collision function, such that that concurrent transmission of data packets to a single wireless client resulting in colliding data packets do not disturb integrity of data within the data packets.

20. The wireless communication system of claim 19, wherein the plurality of wireless access points are operatively coupled to a network controller to receive the coding tables from the network controller.

21. The wireless communication system of claim 19, wherein the plurality of wireless access points are configured to transmit concurrent data packets in a synchronized manner.

22. The wireless communication system of claim 19, wherein at least one of the wireless access points can transmit the coding tables to at least one of the wireless clients enabling the wireless client to decode received data packets.

23. The wireless communication system of claim 19, wherein at least one of the wireless access point monitors associated wireless clients to determine identity of local wireless clients and provides wireless client information to a network controller to dynamically update the coding tables.

24. The wireless communication system of claim 19, wherein at least one of the wireless access points utilizes the coding tables to decode data packets transmitted from one or more of the wireless clients.

* * * * *